(12) United States Patent
Potulska et al.

(10) Patent No.: US 11,061,885 B2
(45) Date of Patent: Jul. 13, 2021

(54) AUTONOMOUS ANOMALY DETECTION AND EVENT TRIGGERING FOR DATA SERIES

(71) Applicant: Intel Corporation, Santa Clara, CA (US)

(72) Inventors: Agnieszka Potulska, Gdynia (PL); Piotr Tylenda, Lysomice (PL); Subhankar Panda, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 16/009,528

(22) Filed: Jun. 15, 2018

(65) Prior Publication Data

US 2019/0042618 A1    Feb. 7, 2019

(51) Int. Cl.
| | |
|---|---|
| *G06F 17/00* | (2019.01) |
| *G06F 16/23* | (2019.01) |
| *G06N 20/00* | (2019.01) |
| *G06F 16/22* | (2019.01) |
| *G06N 5/00* | (2006.01) |
| *G06F 16/2455* | (2019.01) |

(52) U.S. Cl.
CPC ...... *G06F 16/2365* (2019.01); *G06F 16/2246* (2019.01); *G06F 16/24568* (2019.01); *G06N 5/003* (2013.01); *G06N 20/00* (2019.01)

(58) Field of Classification Search
CPC .......... G06F 16/2365; G06F 16/24568; G06F 16/2246; G06N 20/00; G06N 5/003
USPC ........................................................ 707/690
See application file for complete search history.

(56) References Cited

U.S. PATENT DOCUMENTS

| | | | | |
|---|---|---|---|---|
| 9,043,329 | B1* | 5/2015 | Patton .................. | G06F 16/951 |
| | | | | 707/740 |
| 9,798,540 | B1* | 10/2017 | Helie ........................ | G06F 8/42 |
| 10,339,470 | B1* | 7/2019 | Dutta ..................... | G06N 20/20 |
| 10,387,796 | B2* | 8/2019 | Kruglick ................ | G06N 20/00 |
| 10,402,244 | B2* | 9/2019 | Neuvirth-Telem ..... | G06N 20/00 |
| 10,445,311 | B1* | 10/2019 | Saurabh .............. | G06F 16/2365 |
| 2007/0192863 | A1* | 8/2007 | Kapoor .................. | H04L 67/10 |
| | | | | 726/23 |
| 2009/0028416 | A1* | 1/2009 | Floeder .................. | G01N 21/89 |
| | | | | 382/141 |
| 2015/0213358 | A1* | 7/2015 | Shelton .............. | H04L 41/0604 |
| | | | | 706/47 |
| 2016/0179588 | A1* | 6/2016 | Raman .................... | G06F 9/542 |
| | | | | 719/318 |
| 2016/0314237 | A1* | 10/2016 | Luoh .................. | G01R 31/2831 |

(Continued)

OTHER PUBLICATIONS

Fedorova et al., "Plug-in martingales for testing exchangeability on-line", alrw.net/articles/04.pdf, Apr. 13, 2012, 18 pages.

(Continued)

*Primary Examiner* — Pavan Mamillapalli
(74) *Attorney, Agent, or Firm* — Jordan IP Law, LLC

(57) ABSTRACT

An embodiment of a semiconductor package apparatus may include technology to create a range search tree based on a data stream, cluster data from the data stream based on the range search tree and application of a modified density based spatial cluster of applications with noise scheme, and detect an anomaly in the data stream based on the clustered data. Other embodiments are disclosed and claimed.

25 Claims, 18 Drawing Sheets

(56) References Cited

U.S. PATENT DOCUMENTS

2017/0094537 A1* 3/2017 Yang .................... H04W 24/04

OTHER PUBLICATIONS

Wikipedia, "DBSCAN", en.wikipedia.org/wiki/DBSCAN, retrieved on Apr. 25, 2018, 7 pages.
Srivastava et al., "Enabling the discovery of recurring anomalies in aerospace problem reports using high-dimensional clustering techniques", c3.nasa.gov/dashlink/static/media/publication/IEEE_TextMiningPaper_vrs4.pdf, 2006, 17 pages.
Netflix, "Tracking down the villains: Outlier detection at Netflix", medium.com/netflix-techblog/tracking-down-the-villains-outlier-detection-at-nettlix-40360b31732, Jul. 13, 2015, 7 pages.
"PCA-based anomaly detection", docs.microsoft.com/en-us/azure/machine-learning/studio-module-reference/pca-based-anomaly-detection, retrieved on Jan. 24, 2018, 8 pages.
M. Spoczynski, "Snap plugin processor—anomalydetection", github.com/intelsdi-x/snap-plugin-processor-anomalydetection, retrieved on Apr. 25, 2018, 5 pages.

\* cited by examiner

AUTONOMOUS ANOMALY DETECTION AND EVENT TRIGGERING FOR DATA SERIES

TECHNICAL FIELD

Embodiments generally relate to autonomous systems. More particularly, embodiments relate to autonomous anomaly detection and event triggering for data streams.

BACKGROUND

Anomaly detection may refer to the identification of items, events or observations which do not conform to an expected pattern or other items in a dataset. Anomaly detection may be useful for a wide variety of applications such as, for example, network intrusion detection, fraud detection, system monitoring, sensor network event monitoring, ecosystem monitoring, etc.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
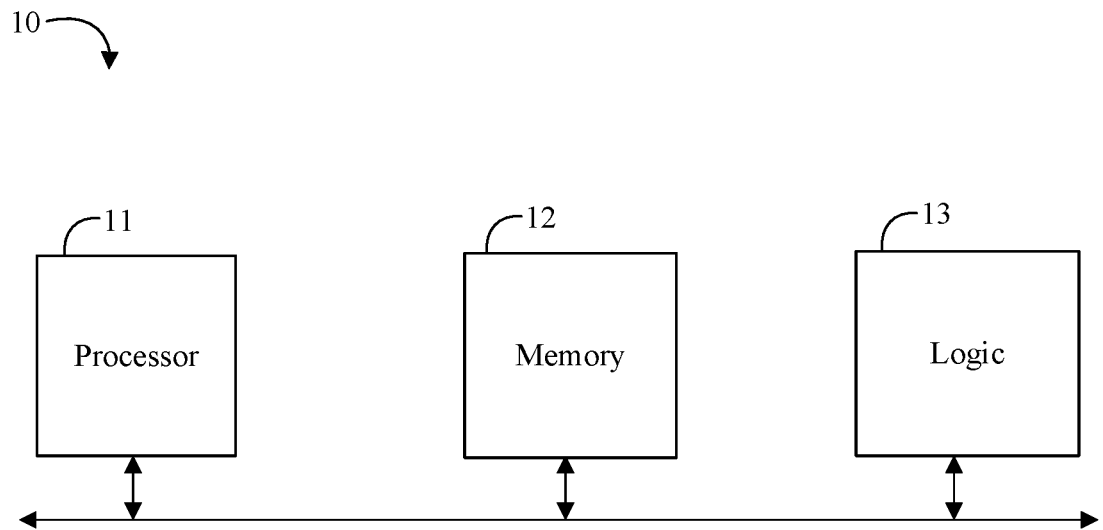
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to create a range search tree based on a data stream, cluster data from the data stream based on the range search tree and density based spatial cluster of applications with noise (DBSCAN), and detect an anomaly in the data stream based on the clustered data. DBSCAN is a machine learning algorithm that can learn what anomalies are in a data stream by knowing the context in which telemetry data is appearing (e.g., clustering data with noise extraction). Some embodiments may cluster data from the data stream based on the range search tree and application of a modified DBSCAN scheme. For example, an anomaly may correspond to an outlier, a novelty, noise, a deviation, and/or an exception in the data. In some embodiments, the logic 13 may be further configured to trigger an event based on the detected anomaly. For example, the data stream may include telemetry data, and some embodiments of the logic 13 may be further configured to divide the telemetry data into one or more sets of short batches of data (e.g., micro-batches), and create the range search tree for each of the one or more sets of short batches of data. For example, the logic 13 may be configured to divide the telemetry data into one or more sets of short batches of data based on a time interval window. In some embodiments, the logic 13 may also be configured to count moving window aggregations of outlier data (e.g., to reduce or prevent false positives). For example, the range search tree may be a self-balancing binary search tree (e.g., the range search tree may be implemented using a self-balanced binary search tree). In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a controller, a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, creating the range search tree, clustering data based on the range search tree and DBSCAN, detecting an anomaly in the data stream, triggering an event based on the detected anomaly, etc.).

Figure 2:
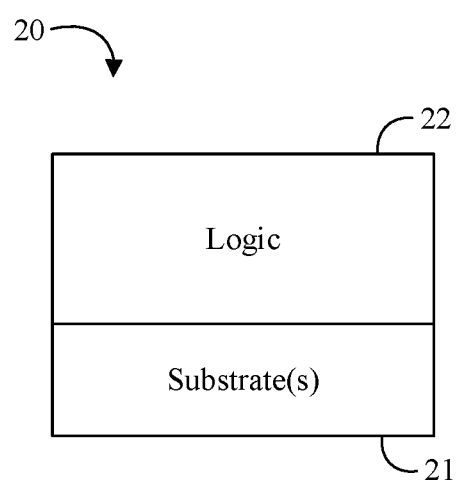
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to create a range search tree based on a data stream, cluster data from the data stream based on the range search tree and application of a modified DBSCAN scheme, and detect an anomaly in the data stream based on the clustered data. In some embodiments, the logic 22 may be further configured to trigger an event based on the detected anomaly. For example, the data stream may include telemetry data, and some embodiments of the logic 22 may be further configured to divide the telemetry data into one or more sets of short batches of data (e.g., micro-batches), and create the range search tree for each of the one or more sets of short batches of data. For example, the logic 22 may be configured to divide the telemetry data into one or more sets of short batches of data based on a time interval window. In some embodiments, the logic 22 may also be configured to count moving window aggregations of outlier data (e.g., to reduce or prevent false positives). For example, the range search tree may be a self-balancing binary search tree. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIG. 3), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3:
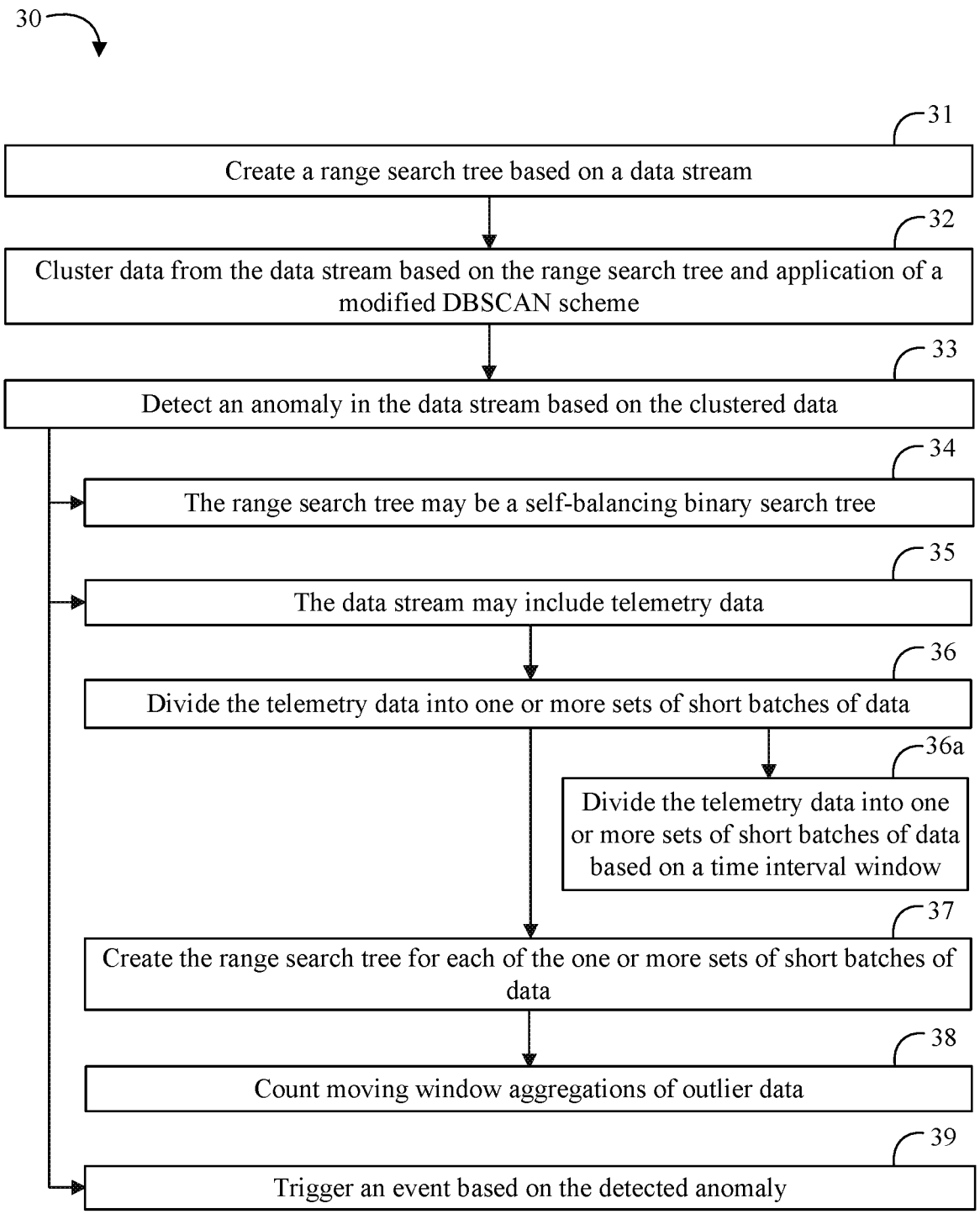
FIG. 3 is a flowchart of an example of a method of processing a data stream according to an embodiment.

Turning now to FIG. 3, an embodiment of a method 30 of processing a data stream may include creating a range search tree based on a data stream at block 31, clustering data from the data stream based on the range search tree and application of a modified DBSCAN scheme at block 32, and detecting an anomaly in the data stream based on the clustered data at block 33. In any of the embodiments herein, the range search tree may be a self-balancing binary search tree at block 34. In some embodiments, the data stream may include telemetry data at block 35, and the method 30 may further include dividing the telemetry data into one or more sets of short batches of data at block 36, and creating the range search tree for each of the one or more sets of short batches of data at block 37. For example, the method 30 may include dividing the telemetry data into one or more sets of short batches of data based on a time interval window at block 36a. Some embodiments of the method 30 may further include counting moving window aggregations of outlier data at block 38. Some embodiments of the method 30 may further include triggering an event based on the detected anomaly at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide an autonomous anomaly detection and event triggering system for internet-of-things (IoT) data streams, and other time series data. In large distributed systems, the high volume and the throughput of the telemetry data may make it difficult or impossible to efficiently react or trigger any events when any anomalous behavior of devices appears. One challenge may be to define precisely what is considered an anomalous behavior of the device. An anomaly may only exist in a context. For example, something considered anomalous in one system with specific workload may be labelled as "regular" in other configurations or workloads. Setting threshold-based rules for alerting (e.g., trigger an alert when a temperature rises above 70 C) may not be sufficient to detect anomalies for more complex systems. In some cases, devices may demonstrate an anomalous behavior even when the telemetry parameters stay within a correct range of values. For example, in a cluster of servers with the same hardware configuration, running the same workload on each node, one or two servers may start reporting a higher number of error-correction-code (ECC) corrected errors on dual-inline memory modules (DIMMs) compared to the rest of the nodes. If the number of ECCs remains below a critical threshold, the anomaly will not be reported.

Anomalous events or behaviors may often indicate some disruption of the system and may require or benefit from specific actions to be executed with reduced or minimal latency. At a large scale, some embodiments of machine learning technology such as DBSCAN may be trained to learn what the anomalies are by knowing the context in which the telemetry data is appearing (e.g., by clustering data with noise extraction). Some embodiments may advantageously be applied to a wide variety of distributed, large scale systems of devices which produce streams of data.

Tukey's test may refer to a single-step multiple comparison procedure and statistical test which may be used on data to find means that are significantly different from each other. INTEL's SNAP framework may utilize Tukey's test for anomaly detection. Exchangeability martingales may be used to test the exchangeability of a time-varying sequence of data. Principal components analysis (PCA) technology may be used to detect anomalies in a dataset. MICROSOFT's AZURE machine learning tool may utilize exchangeability martingales and/or PCA technology to detect anomalies in dataset. High-dimensional clustering technology developed by NASA may be utilized to discover recurring anomalies in aerospace problem reports. The foregoing technologies may impose probabilistic requirements on the data (e.g., Tukey's test), may be more suitable for single time series data (e.g., exchangeability martingales), may involve substantial prior training and high computational complexity (e.g., PCA), and/or may be more suitable for text clustering (e.g., NASA's high-dimensional clustering). In particular, the noted technologies may be limited in applications for monitoring telemetry readings being produced by multiple sources (e.g., devices, agents, etc.) simultaneously (e.g., where multiple sources of identical telemetry data may be abstracted as multiple time series analyzed at the same time). Advantageously, some embodiments may overcome one or more of the foregoing issues to provide technology to detect anomalies by analyzing telemetry data exposed by multiple sources (e.g., multiple time series instances).

Figure 4:
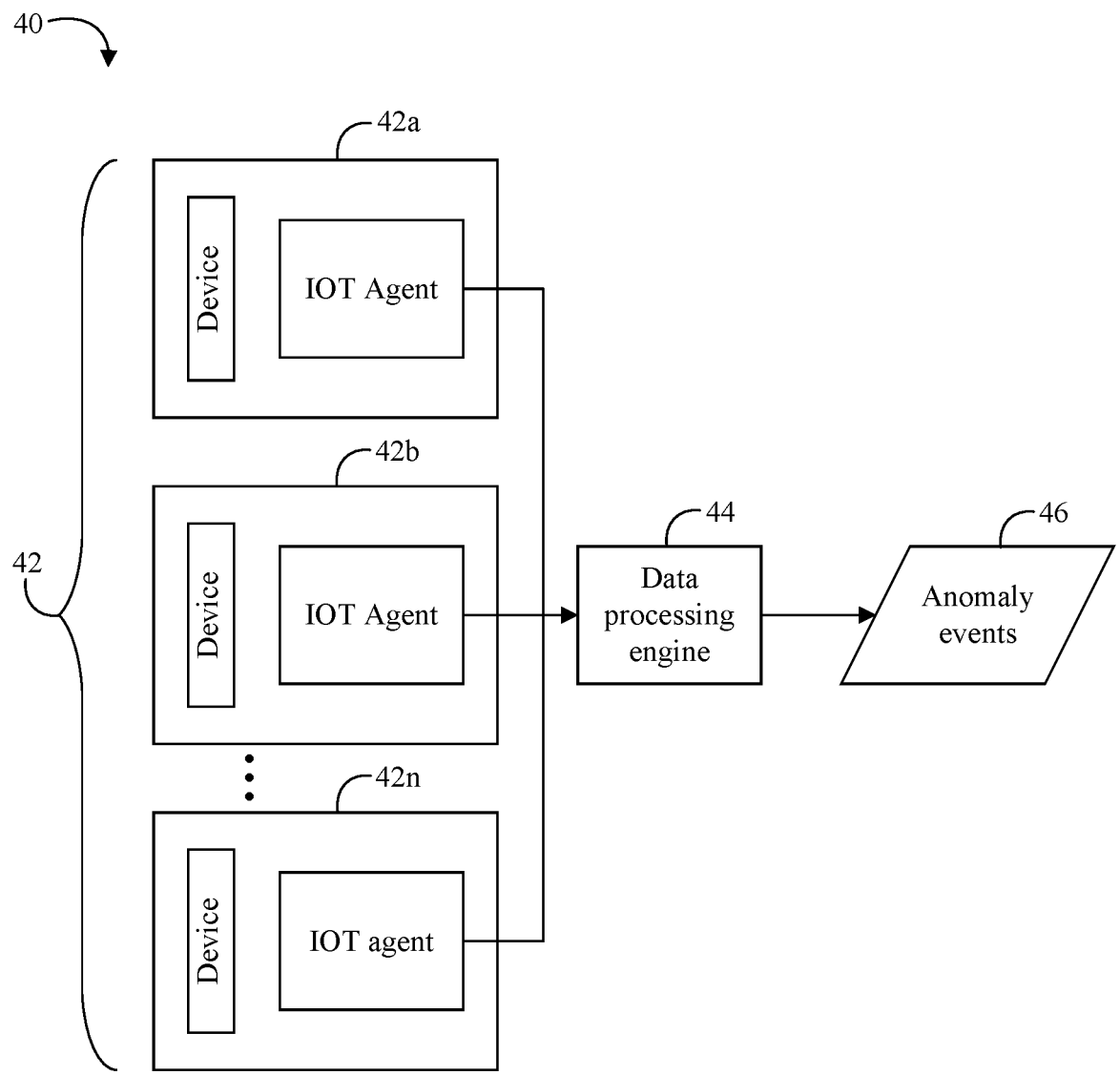
FIG. 4 is a block diagram of an example of an anomaly detection system according to an embodiment.

Turning now to FIG. 4, an embodiment of an anomaly detection system 40 may include two or more devices 42 (e.g., device 42a through 42n) communicatively coupled to a data processing engine 44. In some embodiments, the devices 42 may include respective IoT agents to communicate with the data processing engine 44. The data processing engine 44 may be further coupled to an anomaly event module 46. For example, the anomaly event module 46 may collect anomaly information from the data processing engine 44 and/or trigger events based on the anomaly information from the data processing engine 44. The data processing engine 44 may include technology to trigger events when an anomaly is detected in the system 40, without the prior knowledge of what values of the parameters should be considered an anomaly. For example, the data processing engine 44 may apply clustering to telemetry data from the devices 42 in near-real-time. In some embodiments, the data processing engine 44 may compute the clusters and outliers in micro-batches using DBSCAN technology for noise extraction, improved as described herein for time series data. For example, some embodiments may improve or optimize a neighborhood search in the DBSCAN technique (e.g., using range search trees) for clustering windowed telemetry data. As described in further detail below, some embodiments of the data processing engine 44 may advantageously reduce a worst-case time complexity from $O(n^2)$ to $O(n \log n)$. Some embodiments of the data processing engine 44 may also include technology to prevent false positives by counting moving window aggregations of outliers.

Some embodiments may provide technology for a generic anomaly detection framework for device telemetry data. Some embodiments may be especially suitable for adaptive and self-adjusting software and hardware configurations based on anomaly detection events (e.g., a feedback loop from a machine-learning data processing engine). Some example applications of some embodiments may include, for example, autonomous vehicles (e.g., switching the vehicle into safe mode after an anomaly detection), fleet monitoring (e.g., alerting when a car member of the fleet requires any maintenance), server platform failure prediction (e.g., wear-out detection, monitoring of large datacenters, etc.), telemetry-based conditional breakpoints in CPU/firmware (e.g., code breakpoint is triggered only if a specified anomaly in telemetry is detected), quality assurance and validation of products (e.g., collecting telemetry data and troubleshooting the bugs in the firmware, early bug detection, collecting additional debug data; after an anomaly is detected, the event that will collect additional telemetry/context info is triggered), monitoring and alerting services for the clusters of servers (e.g., exposing the monitoring and alerting services for the server nodes that are part of the cluster to end users, system administrators, etc.).

Figure 5:
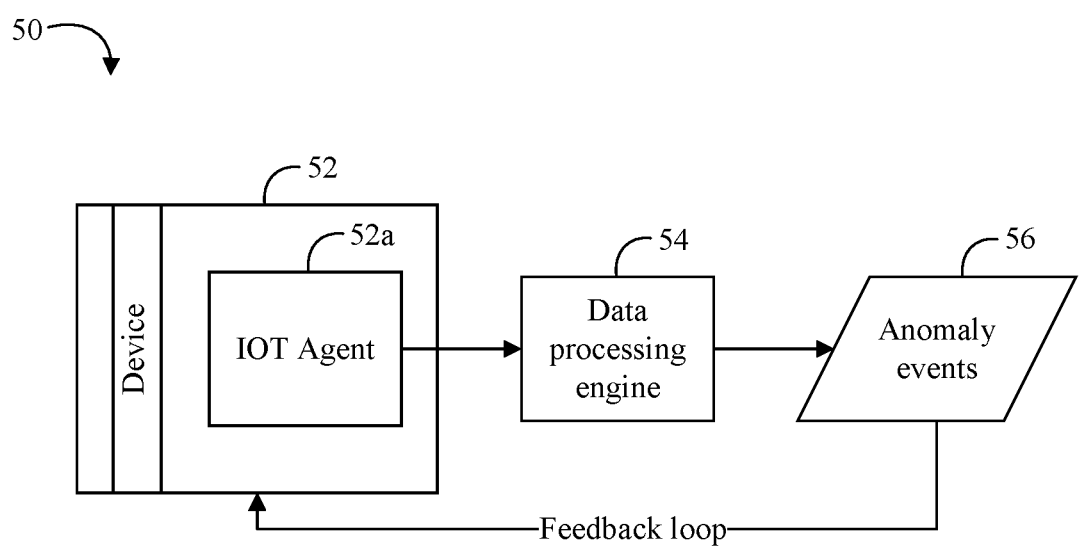
FIG. 5 is a block diagram of another example of an anomaly detection system according to an embodiment.

Turning now to FIG. 5, an embodiment of an anomaly detection system 50 may include a device 52 communicatively coupled to a data processing engine 54. In some embodiments, the device 52 may include an IoT agent 52a to communicate with the data processing engine 54. The data processing engine 54 may include technology to trigger events when an anomaly is detected in the system 50, without the prior knowledge of what values of the parameters should be considered an anomaly (e.g., machine learning technology). The data processing engine 54 may be further coupled to an anomaly event module 56. For example, the anomaly event module 56 may collect anomaly information from the data processing engine 54 and/or trigger events based on the anomaly information from the data processing engine 54. The anomaly event module 56 may be further communicatively coupled to the device 52 with a feedback loop. For example, an event feedback loop may be beneficial for systems which require or benefit from self-adjustment based on telemetry data. Although only one device 52 is shown in FIG. 5, some embodiments of the system 50 may include multiple devices/agents communicatively coupled to the data processing engine 54, one or more of which may include feedback loops with the anomaly event module 56.

Figure 6:
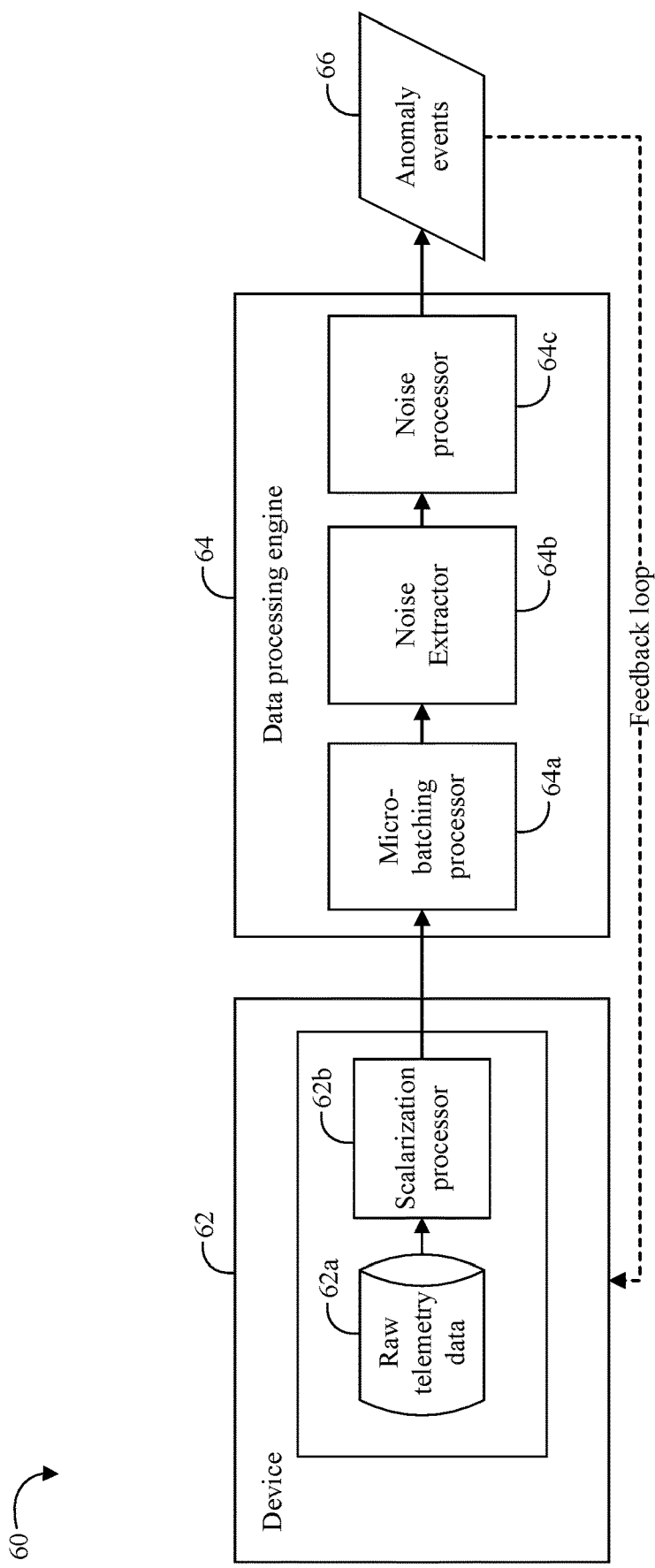
FIG. 6 is a block diagram of another example of an anomaly detection system according to an embodiment.

Turning now to FIG. 6, an embodiment of an anomaly detection system 60 may include a device 62 communicatively coupled to a data processing engine 64. In some embodiments, the device 62 may include an IoT agent (e.g., a firmware/software/OS agent) to communicate with the data processing engine 64. The data processing engine 64 may be further coupled to an anomaly event module 66. For example, the anomaly event module 66 may collect anomaly information from the data processing engine 64 and/or trigger events based on the anomaly information from the data processing engine 64. In some embodiments, the anomaly event module 66 may optionally be further communicatively coupled to the device 62 with a feedback loop. Although only one device 62 is shown in FIG. 6, some embodiments of the system 60 may include multiple devices/agents communicatively coupled to the data processing engine 64, one or more of which may include feedback loops with the anomaly event module 66.

In some embodiments of the system 60, the device 62 may produce raw telemetry data 62a and may include a scalarization processor 62b to transform the raw data 62a. For example, the device 62 may include firmware, software, and/or an OS that provides a repository of current telemetry readings that may be available at any time as the raw telemetry data 62a. For example, the device 62 may take sensor and/or hardware readings as input data and may output vectors of telemetry data, timestamps, etc. as the raw telemetry data 62a. The scalarization processor 62b may be an important component in the IOT agent which may perform vector to scalar transformation of the raw telemetry data 62a. The scalarization technology may provide a dimensionality reduction (e.g., from n dimensions to one (1) dimension) and may reduce a workload for the real-time stream processing by the data processing engine 64. The data processing engine 64 may then operate on the incoming telemetry data immediately.

For example, the scalarization processor 62b may horizontally scale the data processing workload and reduce the bandwidth required to transfer the telemetry data to the data processing engine 64. In some embodiments, the scalarization processor 62b may also remove the noise from the raw telemetry data. The scalarization processor 62b may define one or more parameters including, for example, scalarization type (e.g., scalarization_type corresponding to a selected type of scalarization used in the scalarization processor 62b). In some embodiments, inputs to the scalarization processor 62b may include a vector of the telemetry data, a timestamp, and a scalarization_type. Outputs from the scalarization processor 62b may include a telemetry scalar, a timestamp, and a device_id. The scalarization processor 62b may (1) read in the vector of telemetry data for a given timestamp, and (2) compute the scalar value representing the vector as represented in the following pseudo-code:

```
Switch(scalarization_type):
    Case max:
        Scalar = Tuple(max value of vector, timestamp)
    Case min:
        Scalar = Tuple(min value of vector, timestamp)
    Case average:
        Scalar = Tuple(avg(vector), timestamp)
    Case moving_window:
        Scalar = Tuple(moving_avg(vector), timestamp)
Return (Scalar, timestamp, device_id)
```

The data processing engine 64 may include a micro-batching processor 64a communicatively coupled to the scalarization processor 62b, a noise extractor 64b coupled to the micro-batching processor 64a (e.g., including modified DBSCAN clustering technology for noise extraction), and a noise processor 64c coupled to the noise extractor 64b. In order to apply DBSCAN clustering in real-time on a stream of telemetry data, the micro-batching processor 64a may divide the stream into a set of short batches of input data. These batches may be based on time interval windowing. The value of the interval may be dependent on telemetry data collection frequency and the data processing engine 64 bandwidth for a given number of devices that are being analyzed at the same time. In some embodiments, the inputs to the micro-batching processor 64a may have inputs including telemetry_scalar, timestamp, and device_id, and may provide outputs including an array of vectors (telemetry_scalar, device_id, timestamp). In some embodiments, the micro-batching processor 64a may include technology to create a short batch of input data corresponding to the following pseudo-code:

```
Set start_window as time.now( )
Set end_window as start_window – time.delta(0.5 min)
Read in the vectors that have timestamp => start_window &&
    timestamp <= end window
Add filtered vectors to array of vectors (telemetry_scalar,
    device_id, timestamp)
Return the array
```

Some embodiments of the noise extractor 64b may advantageously provide modified DBSCAN clustering technology for noise extraction. The improved DBSCAN technology may be utilized to cluster the micro-batches of telemetry data. For example, a DBSCAN technique may be modified to be improved or optimized for a specific use case of anomaly detection in time series data. Some embodiments may be configured for clustering of one-dimensional batches of data and may incorporate data structures for space partitioning which may significantly improve performance as compared to a general purpose DBSCAN technique.

Any suitable range search tree technology may be utilized. Some embodiments may advantageously utilize self-balancing binary search trees as range search trees for the improved DBSCAN technology. An example of a suitable self-balancing binary search tree may include an AVL tree (e.g., named after Georgy Adelson-Velsky and Evgenii Landis' tree). In an AVL tree, for example, the heights of the two child subtrees of any node may differ by at most one. If at any time the two child subtrees differ by more than one, rebalancing may be done to restore this property. Constructing an AVL tree may discover which points cannot be assigned to any well-defined data clusters. The data points which cannot be assigned to any well-defined data clusters may be labelled as "Noise" and may be classified as anomaly candidates. The anomaly candidates may later be reported as an anomaly event (e.g., by an anomaly event module).

In some applications, IoT telemetry data may be an unevenly spaced time series of data. For example, observations may appear irregularly, and the spacing between the data points may not be constant across the whole dataset. Some embodiments may advantageously bucket the telemetry data in time windows, so that the time-proximity of the points may be preserved. Because of that, a second improvement/optimization may take advantage of the fact that this use case may be simplified to one-dimensional space clustering (e.g., extracting only the telemetry_scalar value). Some embodiments of the noise extractor 64b may take as input a dataset corresponding to the array of vectors (telemetry_scalar, device_id, timestamp) from the micro-batching processor 64a, and may provide an output of noise_points (e.g., which may also have the form of an array of vectors (telemetry_scalar, device_id, timestamp)). Some embodiments may advantageously utilize range trees for space partitioning to improve/optimize the DBSCAN technique specifically for time series clustering (e.g., as described in more detail in FIGS. 7A to 7C).

In some embodiments, the noise processor 64c may analyze telemetry data points labeled as "Noise" to determine whether a noise point may be considered a real anomaly. In some embodiments, the noise processor 64c may provide a compatible framework for any classification technology for noise points. For example, the noise processor 64c may include a predefined threshold of how many times a given point may be labeled as "Noise" in subsequent micro-batches before the noise point is classified as an anomaly. Advantageously, some embodiments may address possible shifts in time axis of the telemetry characteristics. In some embodiments, the noise processor 64c may include supervised learning technology to classify the noise point(s) as anomalies. For example, the noise processor 64c may include one or more of an artificial neural network, logistic regression, or Bayesian classification technology.

In some embodiments, the noise processor 64c may take noise points from the noise extractor 64b as input (e.g., noise_points corresponding to an array of vectors (telemetry_scalar, device_id, timestamp)) together with a noise threshold (e.g., noise threshold corresponding to an integer parameter which may define a threshold for classifying a noise point as an anomaly; in some embodiments noise threshold may be preferred to be 3-10). The noise processor 64c may provide an output of anomaly points (e.g., anomaly_points corresponding to an array of vectors (telemetry_scalar, device_id, timestamp)). In some embodiments, the noise extractor 64b may include technology corresponding to the following pseudo-code:

```
If anomaly_candidate_cache does not exist (from previous micro-
    batch), create anomaly_candidate_cache as an empty
    dictionary (hash map of device_id to integer
    candidate_counter);
Copy anomaly_candidate_cache as
    previous_anomaly_candidate_cache;
For each point n in noise_points:
        If n.device_id exists in anomaly_candidate_cache,
            increment candidate_counter and remove entry for
            n.device_id from dictionary
            previous_anomaly_candidate_cache;
        If n.device_id does not exist in anomaly_candidate_cache,
            add n.device_id with candidate_counter = 0;
Remove all entries from anomaly_candidate_cache for which key
    is present in previous_anomaly_candidate_cache (e.g., this
    indicates that a given entry did not survive candidate
    selection);
Initialize anomaly_points = empty array of (telemetry_scalar,
    device_id, timestamp);
For each point n in noise_points:
        If anomaly_candidate_cache[n.device_id] >
            noise_threshold, add n to anomaly_points (e.g.,
            anomaly for device_id was found);
Return array of vectors anomaly_points.
```

In some embodiments, the anomaly events module 66 may include an event publish/subscribe (pub-sub) system for publishing information concerning discovered anomalies in near real-time. For example, the noise processor 64c may expose a message concerning each detected anomaly. The exposed messages may be consumed by any number of clients that may have subscribed for receiving notifications. In the case of a feedback loop, for example, the producer of raw telemetry data (e.g., the device) may also be a consumer of anomaly events. The structure of the message may include the source of the anomaly (e.g., device_id) and telemetry data points (e.g., telemetry_scalar) that may have triggered the message. Any suitable event pub-sub technology may be utilized. For example, APACHE KAFKA may provide a suitable event pub-sub system.

In some embodiments, the transfer of data between device firmware and the data processing engine 64 may be performed in pull/push approach depending on the requirements and firmware capabilities. In the case of pull architecture, the firmware may expose scalarized telemetry data available for querying. In a push architecture, the firmware may report new telemetry data using, for example, Advanced Message Queuing Protocol (AMQP).

Figure 7A:
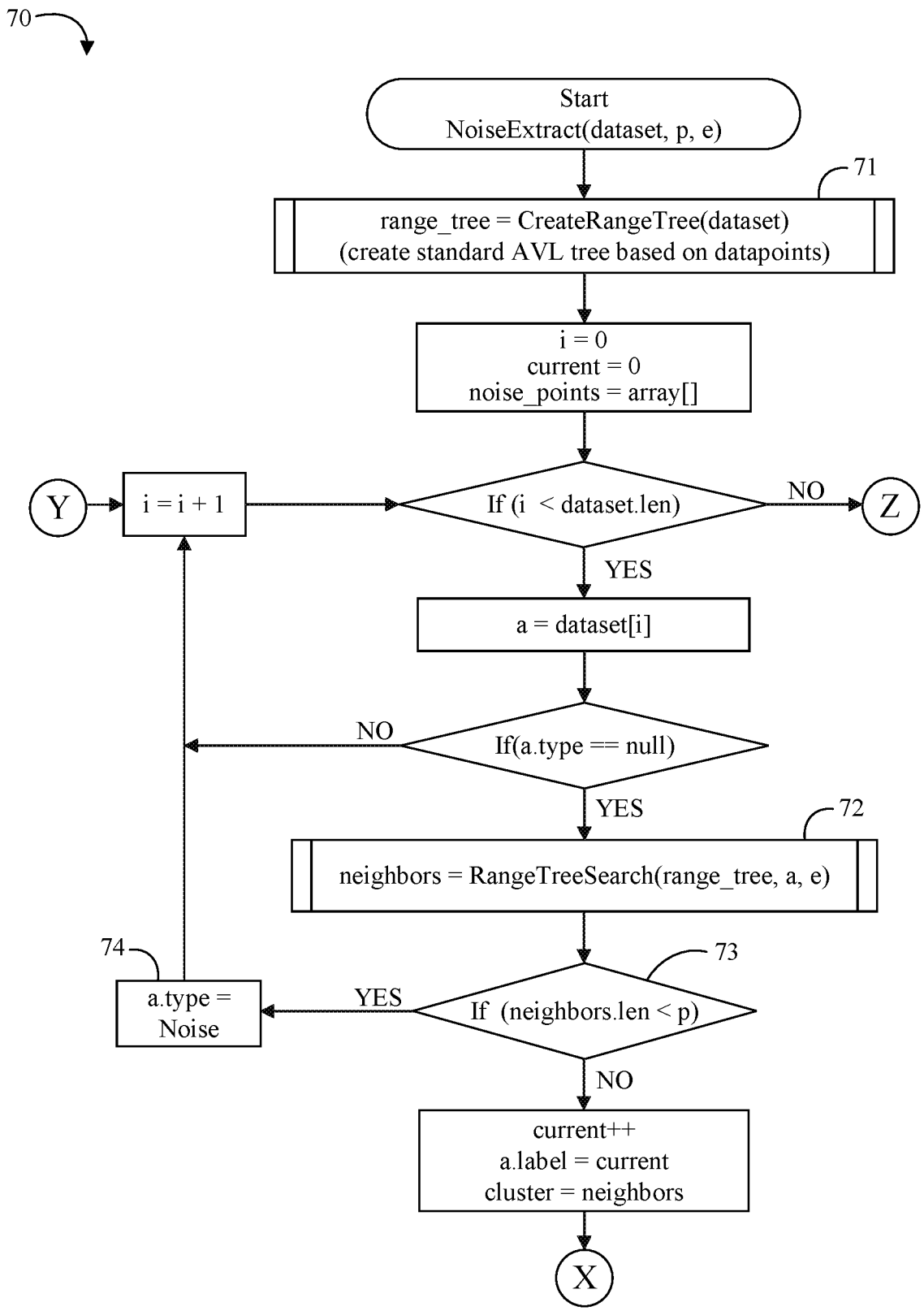
FIGS. 7A to 7C are flowcharts of an example of a method of extracting noise from a dataset according to an embodiment.
Figure 7B:
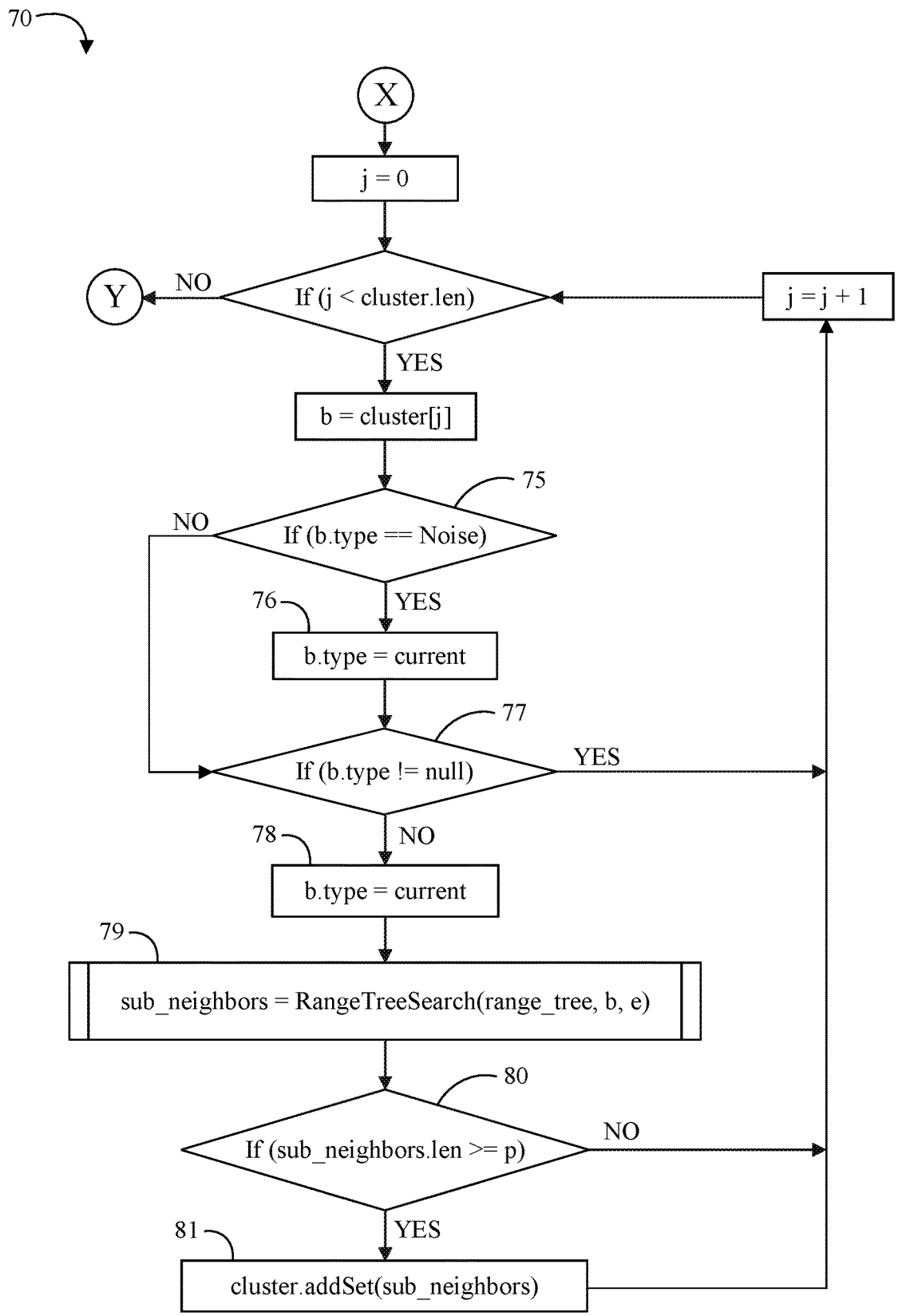
Figure 7C:
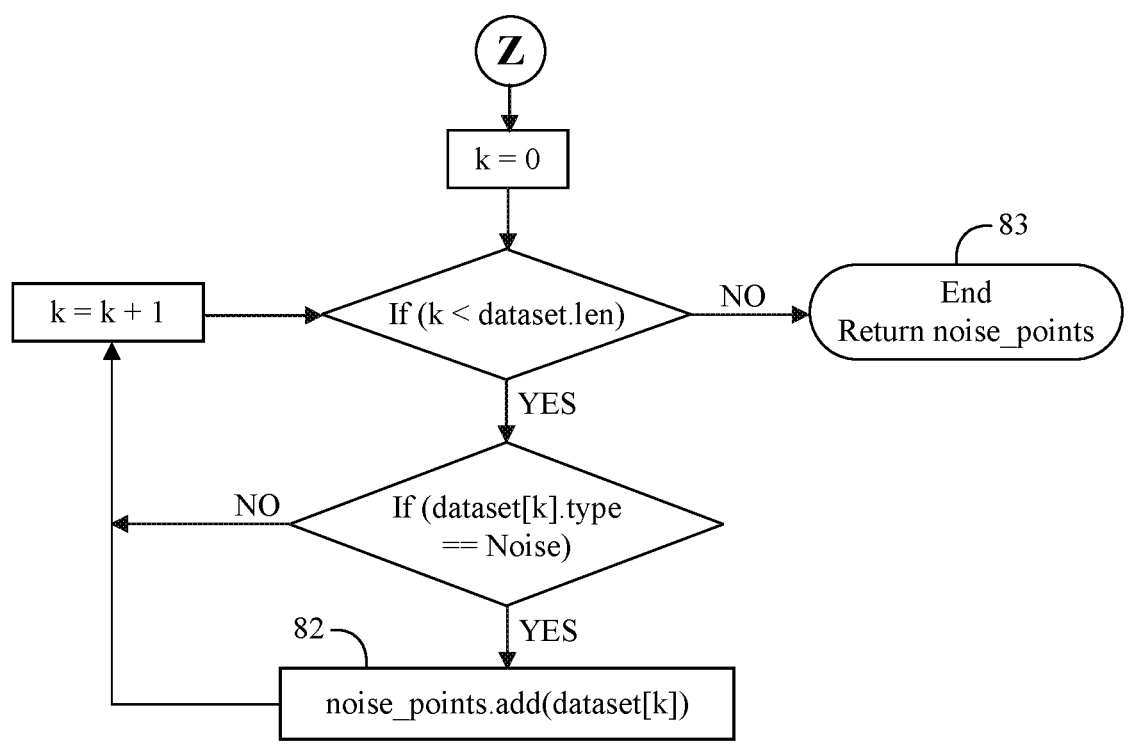

Turning now to FIGS. 7A to 7C, a method 70 of extracting noise from a dataset may include initializing/creating a range search tree range_tree=CreateRangeTree(dataset) at block 71, implemented as an AVL tree (e.g., using any suitable AVL tree technology), and then using range_tree for quick and repeated range search inside dataset. For each point a in dataset, the method 70 may include finding neighbors for point a within e range at block 72 (e.g., where e corresponds to a maximum distance for neighborhood range search). Block 72 may use a range tree search based on range_tree, a, and e (e.g., see method 85, FIG. 8). If a count of neighbors<p at block 73 (e.g., where p corresponds to a minimum number of points required to form a cluster; in some embodiments p may be preferred to be 5-10), the method 70 may label point a as "Noise" at block 74, and proceed to the next point in dataset. For each point b in (neighbors+a), the method 70 may include determining if b is Noise at block 75, and if so, labeling b as a point assigned to a cluster at block 76. Otherwise, if b has any label at block 77, the method 70 may proceed to the next point in loop. If b is not labeled at block 77, the method 70 may include labeling point b as assigned to the cluster at block 78, and then find sub_neighbors for point b within e range (e.g., using the method 85, FIG. 8) at block 79. If a count of sub_neighbors<p at block 80, the method 70 may include extending neighbors with sub_neighbors at block 81. After all of the points in dataset have been analyzed, the method 70 may include adding points labeled as "Noise" to noise_points at block 82 and return noise_points at block 83 (e.g., an array of points in dataset which are marked as "Noise"). For example, the method 70 may include a modified DBSCAN clustering algorithm for noise extraction from data micro-batches.

Figure 8:
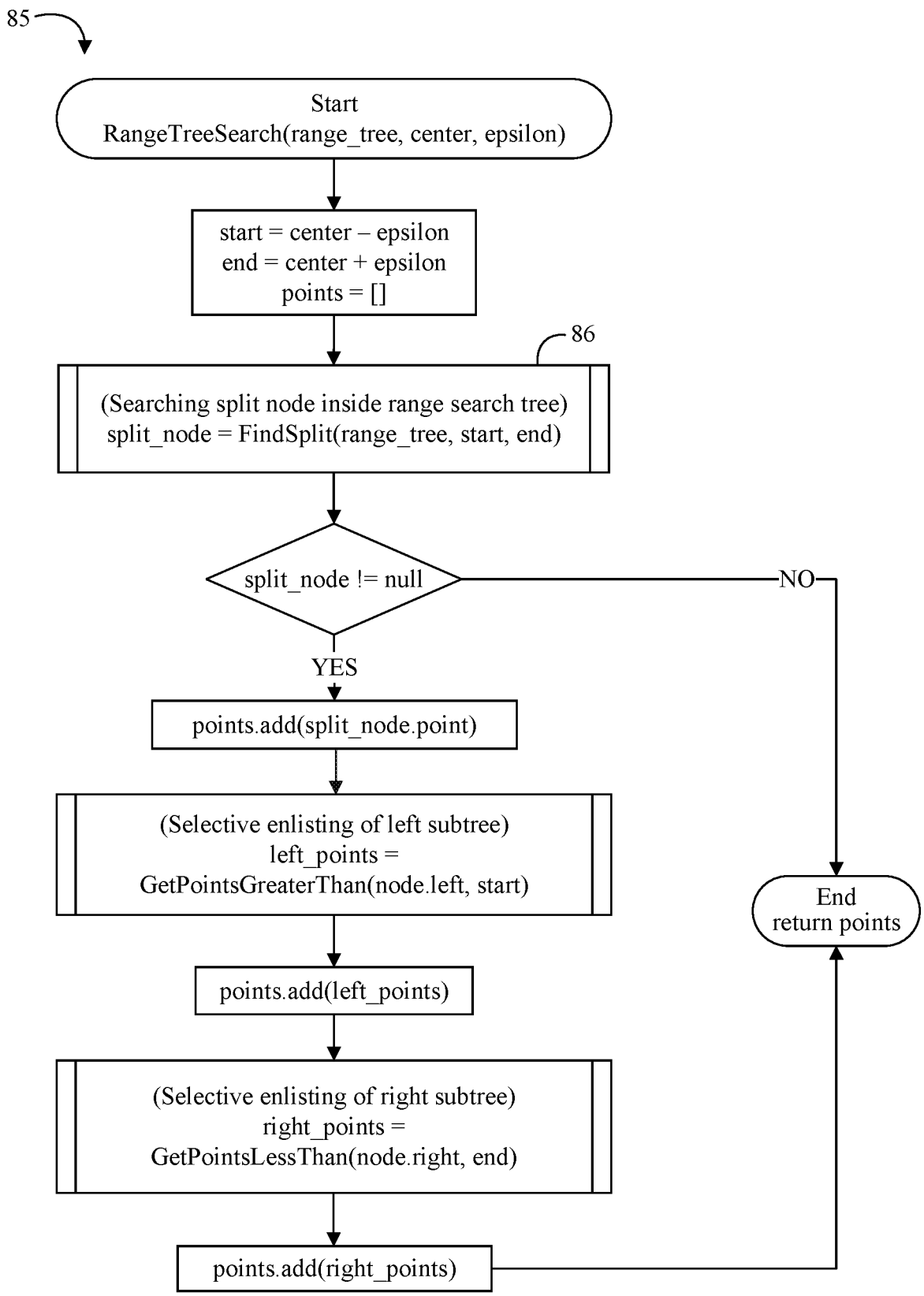
FIG. 8 is a flowchart of an example of a method of searching a range tree according to an embodiment.
Figure 9:
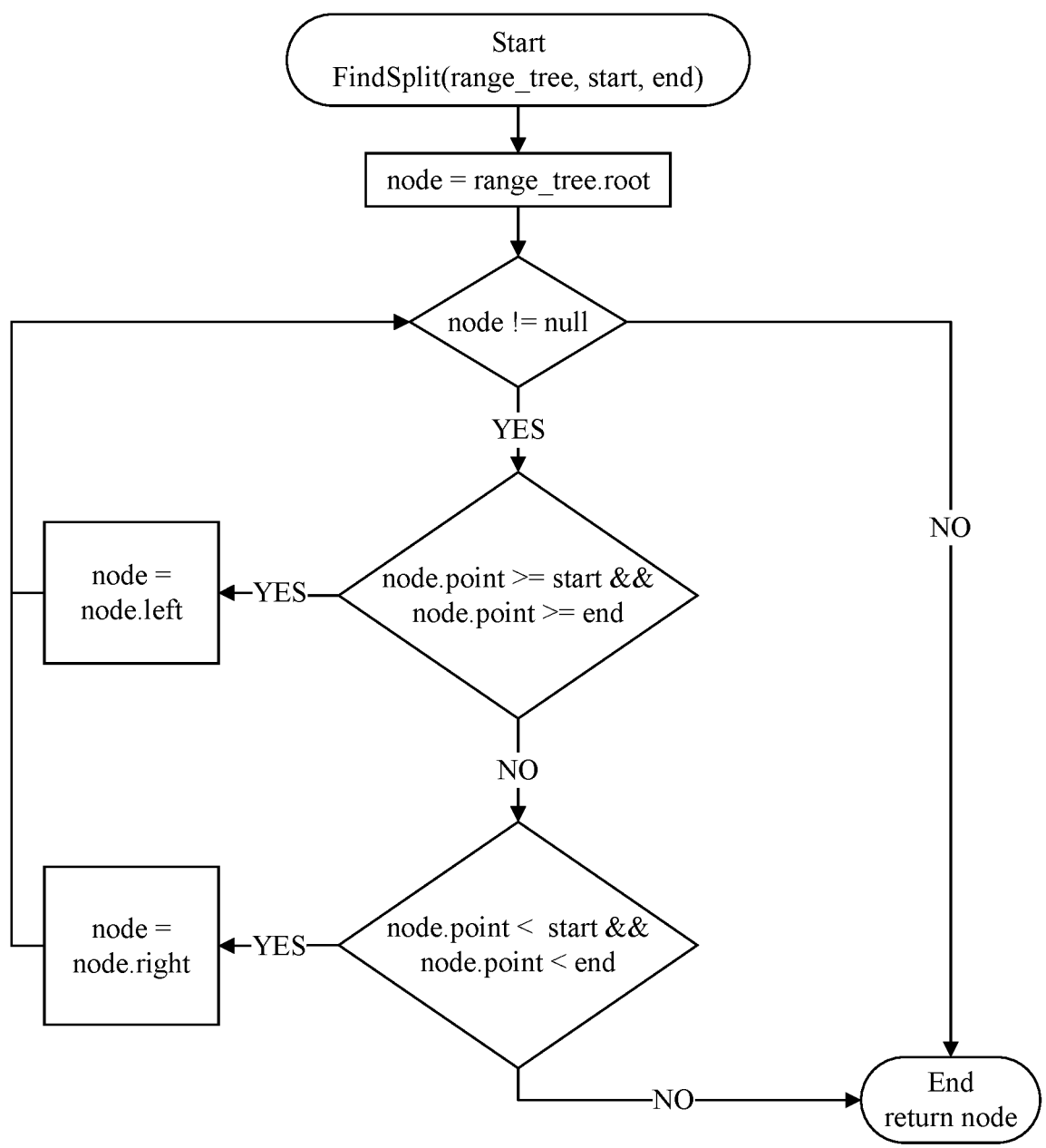
FIG. 9 is a flowchart of an example of a method of finding a split node in a range search according to an embodiment.
Figure 10:
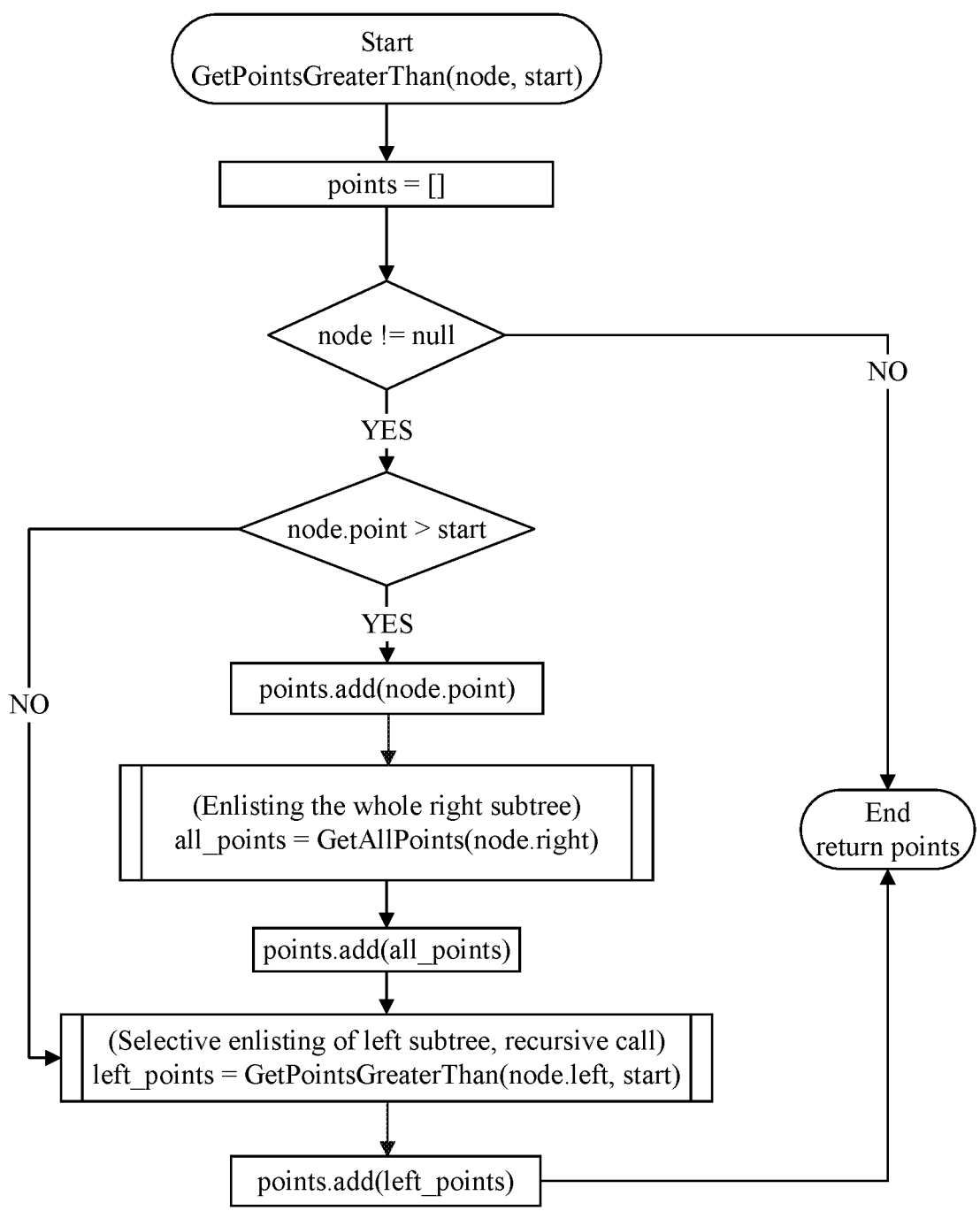
FIG. 10 is a flowchart of an example of a method of finding of data points above a lower range value according to an embodiment.
Figure 11:
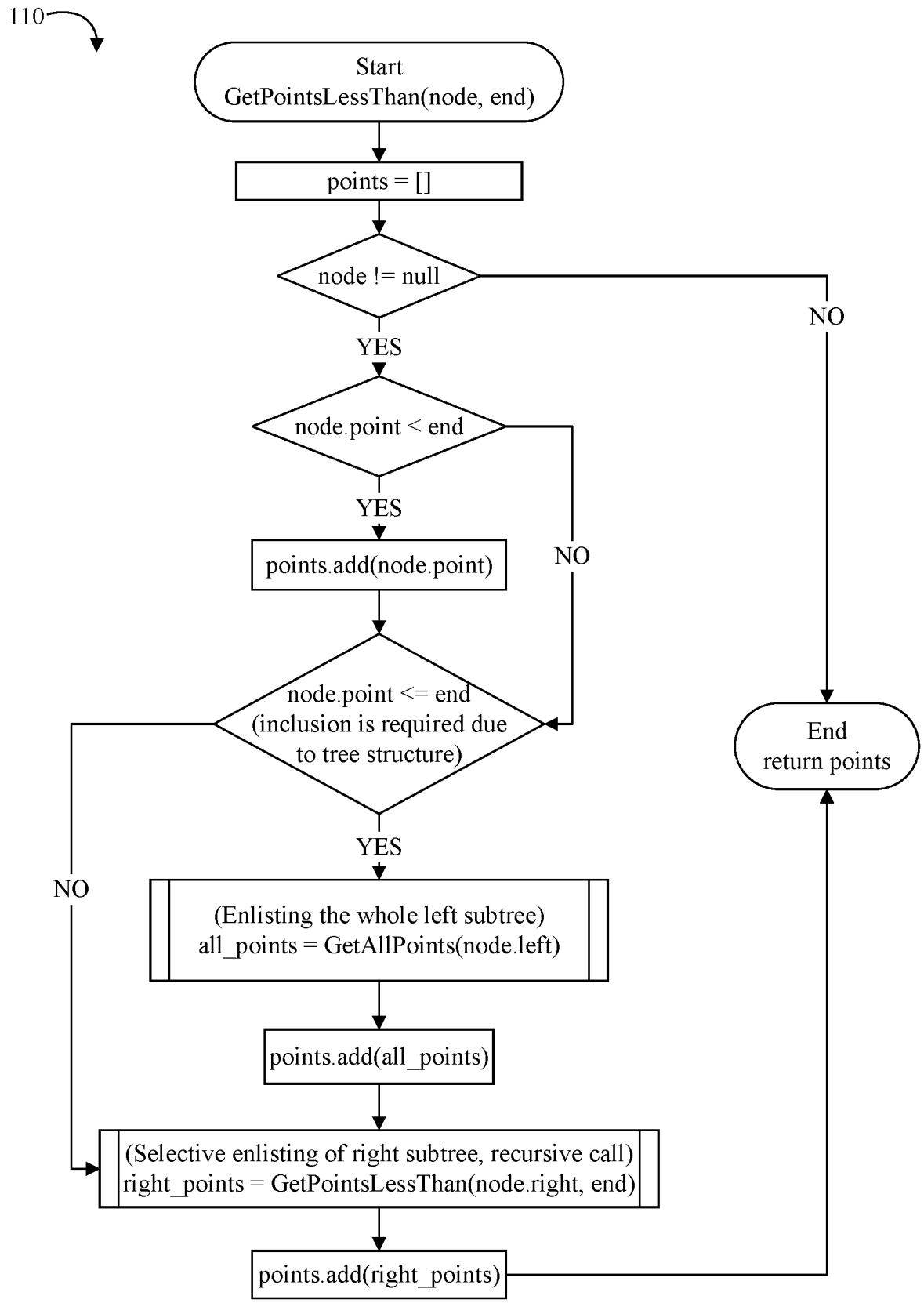
FIG. 11 is a flowchart of an example of a method of finding of data points below an upper range value according to an embodiment.

Turning now to FIG. 8, an embodiment of a method 85 of searching a range tree (e.g., implementing a RangeTreeSearch function) for an AVL tree may include searching a split node inside the range search tree at block 86. An example of a suitable FindSplit function may include the method 90 (FIG. 9). An example of a suitable GetPointsGreaterThan function may include the method 100 (FIG. 10). An example of a suitable GetPointsLessThan function may include the method 110 (FIG. 11). Advantageously, the method 85 may perform a quick range search of the current dataset using the AVL tree. The method 85 may include finding a split node and retrieving data points which are children of the split node. For example, the split node may be considered as a cutoff point, below which tree paths for searching upper and lower bounds diverge (e.g., upper and lower bounds may be determined by current data point and neighborhood search epsilon value). For an AVL tree, finding the split node may be performed efficiently in O(log n) in the worst case (e.g., the maximum height of the tree). After finding the split point, the next stage may include retrieving data from nodes below the split point. The method 100 may be used for retrieving data from the left AVL subtree, while the method 110 may be used for retrieving data from the right AVL subtree. The methods 100 and 110 may use the helper method 120 for retrieving all nodes from an AVL subtree, which may be used when it is possible to retrieve whole subtree without additional range checks.

Figure 12:
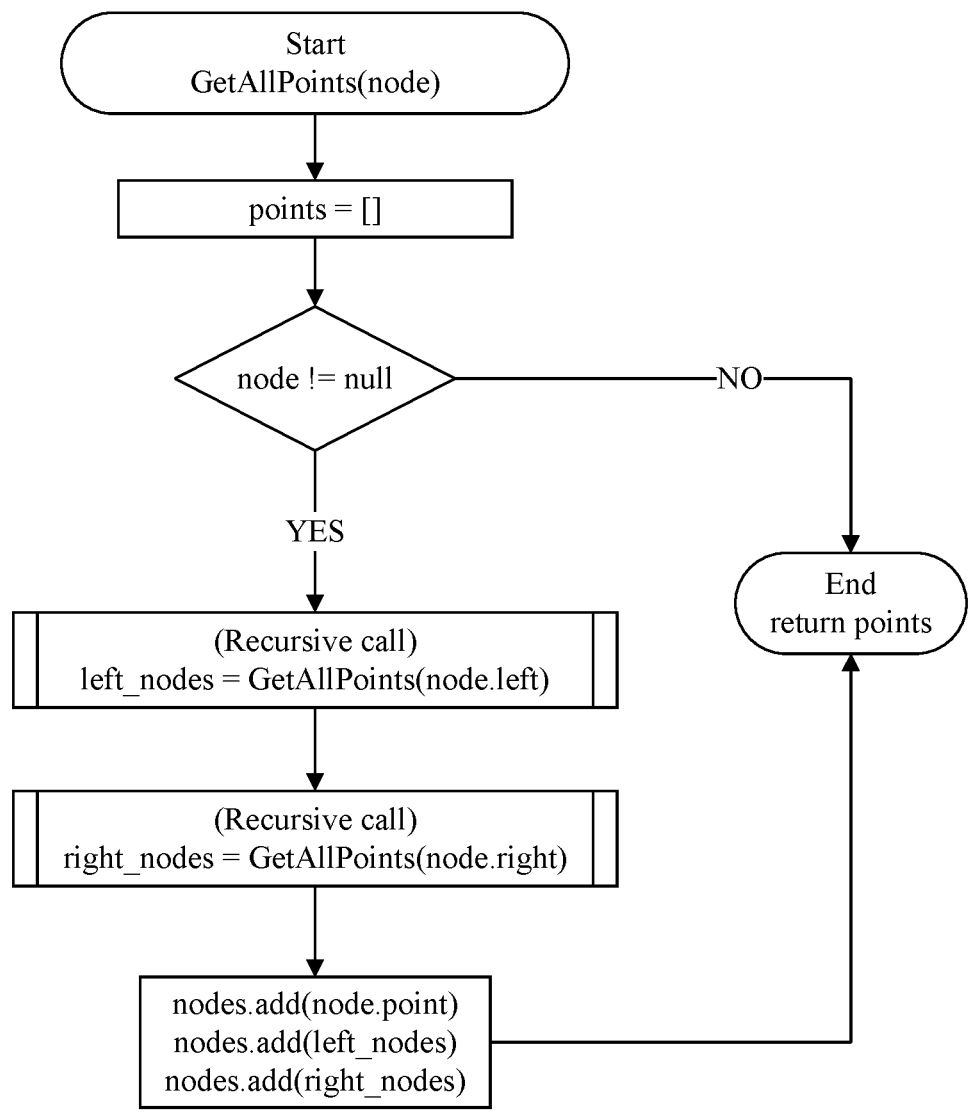
FIG. 12 is a flowchart of an example of a method of retrieving all data points from AVL subtree according to an embodiment.

Turning now to FIG. 9, an embodiment of a method 90 of finding a split node in a range search (e.g., implementing a FindSplit function) may include traversing the range tree to find a split point. These methods also run in O(log n), thanks to AVL tree guaranteed properties. Turning now to FIG. 10, an embodiment of a method 100 may include finding of data points above a lower range value (e.g., a GetPointsGreaterThan function). An example of a suitable GetAllPoints function may include the method 120 (FIG. 12). Turning now to FIG. 11, an embodiment of a method 110 may include fast finding of data points below an upper range value (e.g., a GetPointsLessThan function). An example of a suitable GetAllPoints function may include the method 120 (FIG. 12). Turning now to FIG. 12, an embodiment of a method 120 may include retrieving all data points from AVL subtree (e.g., a GetAllPoints function).

Advantageously, the method 70 for noise extraction (e.g., the NoiseExtract function with modified DBSCAN technology) may improve or optimize the computational complexity for a range tree search using an AVL tree (e.g., instead of conventional DBSCAN range search techniques). Although some embodiments may be also generalized to n-dimensional real spaces, a clustering problem which may be solved in one-dimensional real space may benefit from embodiments of the method 70. For example, the overall time complexity of NoiseExtract (e.g., the method 70) may decrease from $O(n^2)$ in the worst case (e.g., for conventional DBSCAN technology) to only $O(n \log n)$ in the worst case, where n is the number of points in the current dataset (e.g., corresponding to a window of data). Some embodiments may advantageously be applied to analyze large amounts of data in real time. Some embodiments may be particularly useful for IoT applications, where efficient analysis may be important for real-time or near-real time response.

Figure 13:
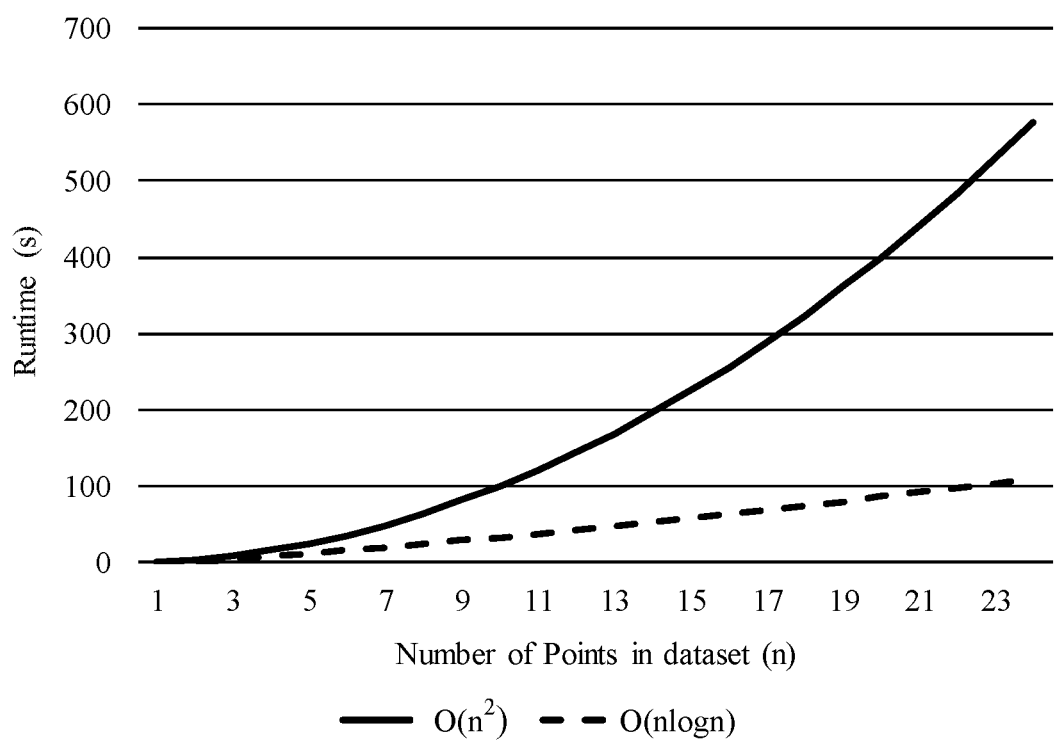
FIG. 13 is a comparison graph of an example of number of points in a dataset versus runtime according to an embodiment.

Turning now to FIG. 13, an embodiment of a graph of number of points in a dataset (n) versus runtime shows an example potential improvement of a worst case time of $O(n^2)$ (e.g., for conventional DBSCAN technology) versus $O(n \log n)$ (e.g., for improved DBSCAN technology according to some embodiments).

Figure 14:
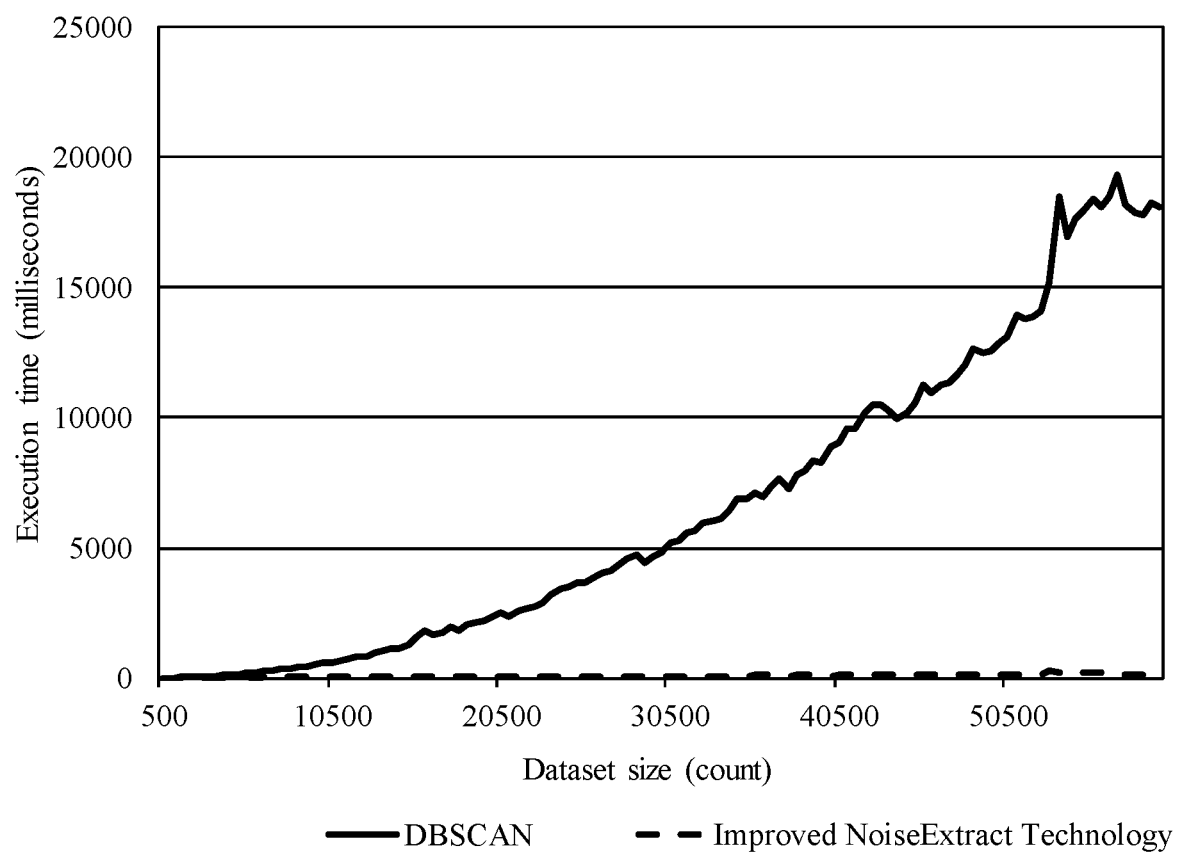
FIG. 14 is a comparison graph of an example of dataset size versus execution time according to an embodiment.

Turning now to FIG. 14, an embodiment of a graph of dataset size versus execution time shows an example potential improvement in execution for an embodiment of NoiseExtract technology (e.g., the method 70) versus conventional DBSCAN technology. Advantageously, some embodiments may not result in any loss of accuracy and may lead to exactly the same result (e.g., noise points cluster) as compared to conventional DBSCAN technology.

Figure 15A:
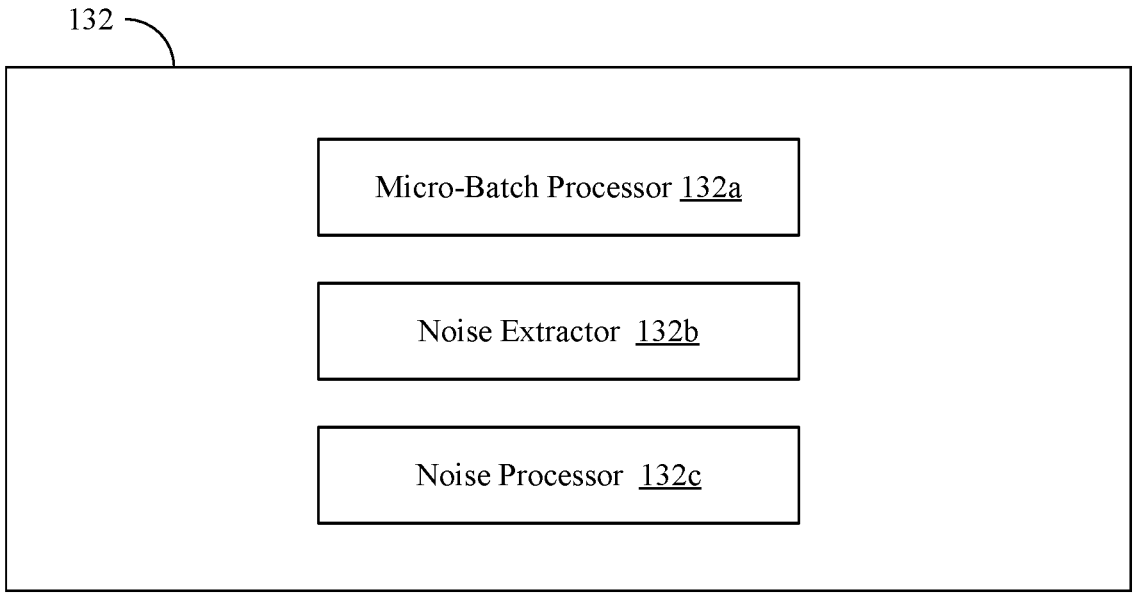
FIGS. 15A and 15B are block diagrams of examples of anomaly detection apparatuses according to embodiments.

FIG. 15A shows an anomaly detection apparatus 132 (132a-132c) that may implement one or more aspects of the method 30 (FIG. 3), the method 70 (FIGS. 7A to 7C), the method 85 (FIG. 8), the method 90 (FIG. 9), the method 100 (FIG. 10), the method 110 (FIG. 11), and/or the method 120 (FIG. 12). The anomaly detection apparatus 132, which may include logic instructions, configurable logic, fixed-functionality hardware logic, may be readily substituted for the system 10 (FIG. 1), the data processing engine 44, the data processing engine 54, and/or the data processing engine 64, already discussed. A micro-batch processor 132a may include technology to create a range search tree based on a data stream. A noise extractor 132b may include technology to cluster data from the data stream based on the range search tree and DBSCAN. A noise processor 132c may include technology to detect an anomaly in the data stream based on the clustered data. In some embodiments, the anomaly detection apparatus 132 may be further configured to trigger an event based on the detected anomaly. For example, the data stream may include telemetry data, and some embodiments of the micro-batch processor 132a may be further configured to divide the telemetry data into one or more sets of short batches of data (e.g., micro-batches), and create the range search tree for each of the one or more sets of short batches of data. For example, the micro-batch processor 132a may be configured to divide the telemetry data into one or more sets of short batches of data based on a time interval window. In some embodiments, the anomaly detection apparatus 132 may also be configured to count moving window aggregations of outlier data (e.g., to reduce or prevent false positives). For example, the range search tree may be a self-balancing binary search tree.

Figure 15B:
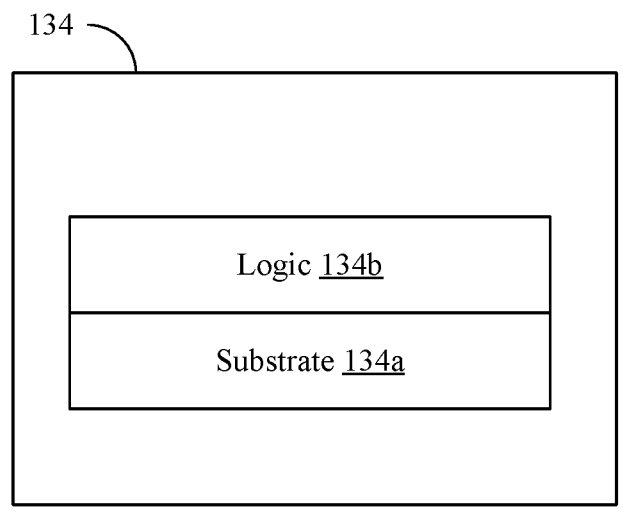

Turning now to FIG. 15B, anomaly detection apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIG. 3), the method 70 (FIGS. 7A to 7C), the method 85 (FIG. 8), the method 90 (FIG. 9), the method 100 (FIG. 10), the method 110 (FIG. 11), and/or the method 120 (FIG. 12). Thus, the logic 134b may create a range search tree based on a data stream, cluster data from the data stream based on the range search tree and DBSCAN, and detect an anomaly in the data stream based on the clustered data. In some embodiments, the logic 134b may be further configured to trigger an event based on the detected anomaly. For example, the data stream may include telemetry data, and some embodiments of the logic 134b may be further configured to divide the telemetry data into one or more sets of short batches of data (e.g., micro-batches), and create the range search tree for each of the one or more sets of short batches of data. For example, the logic 134b may be configured to divide the telemetry data into one or more sets of short batches of data based on a time interval window. In some embodiments, the logic 134b may also be configured to count moving window aggregations of outlier data (e.g., to reduce or prevent false positives). In one example, the apparatus 134 is a semiconductor die, chip and/or package.

Figure 16:
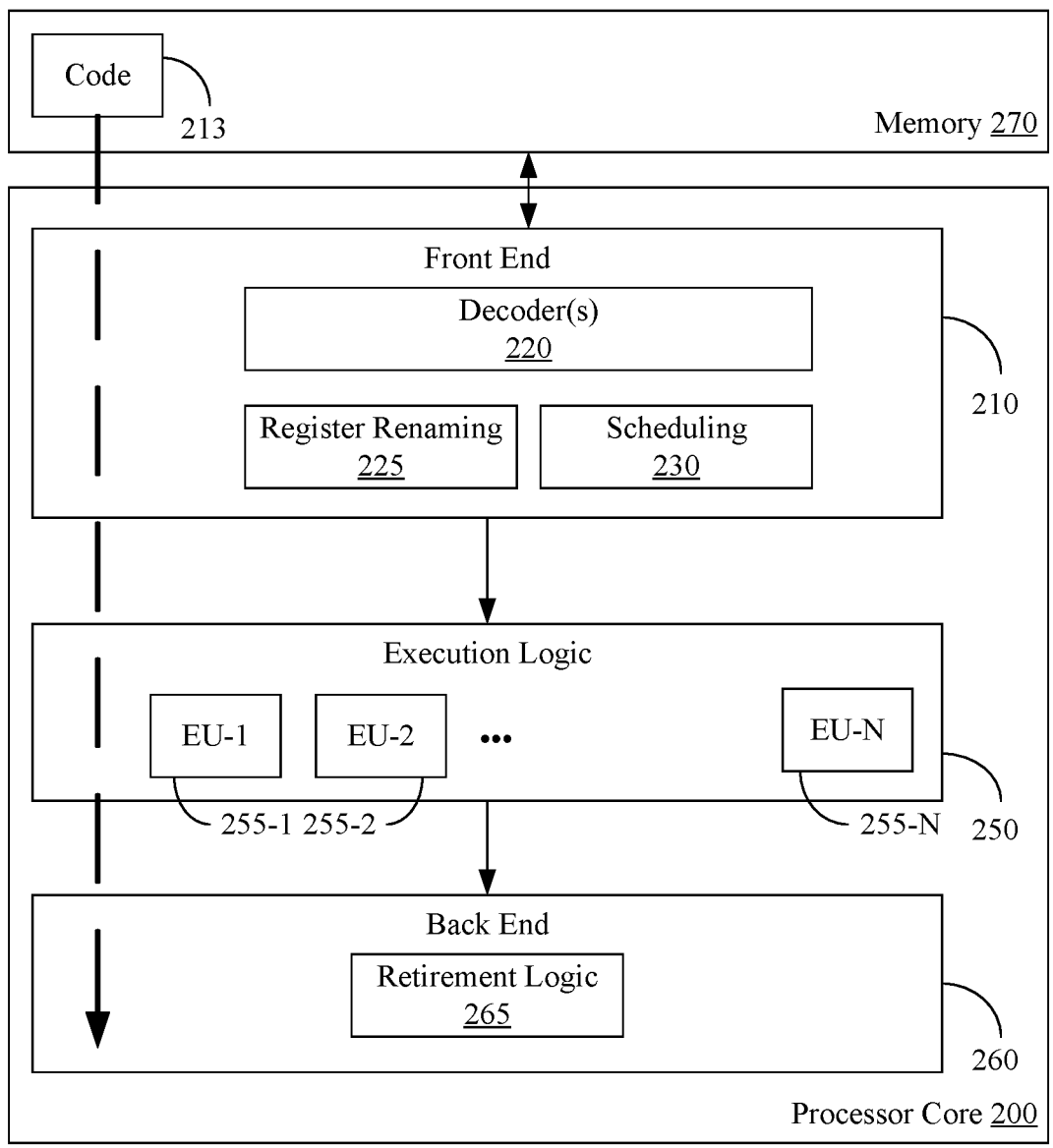
FIG. 16 is a block diagram of an example of a processor according to an embodiment.

FIG. 16 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 16, a processing element may alternatively include more than one of the processor core 200 illustrated in FIG. 16. The processor core 200 may be a single-threaded core or, for at least one embodiment, the processor core 200 may be multithreaded in that it may include more than one hardware thread context (or "logical processor") per core.

FIG. 16 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 3), the method 70 (FIGS. 7A to 7C), the method 85 (FIG. 8), the method 90 (FIG. 9), the method 100 (FIG. 10), the method 110 (FIG. 11), and/or the method 120 (FIG. 12), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 16, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 17:
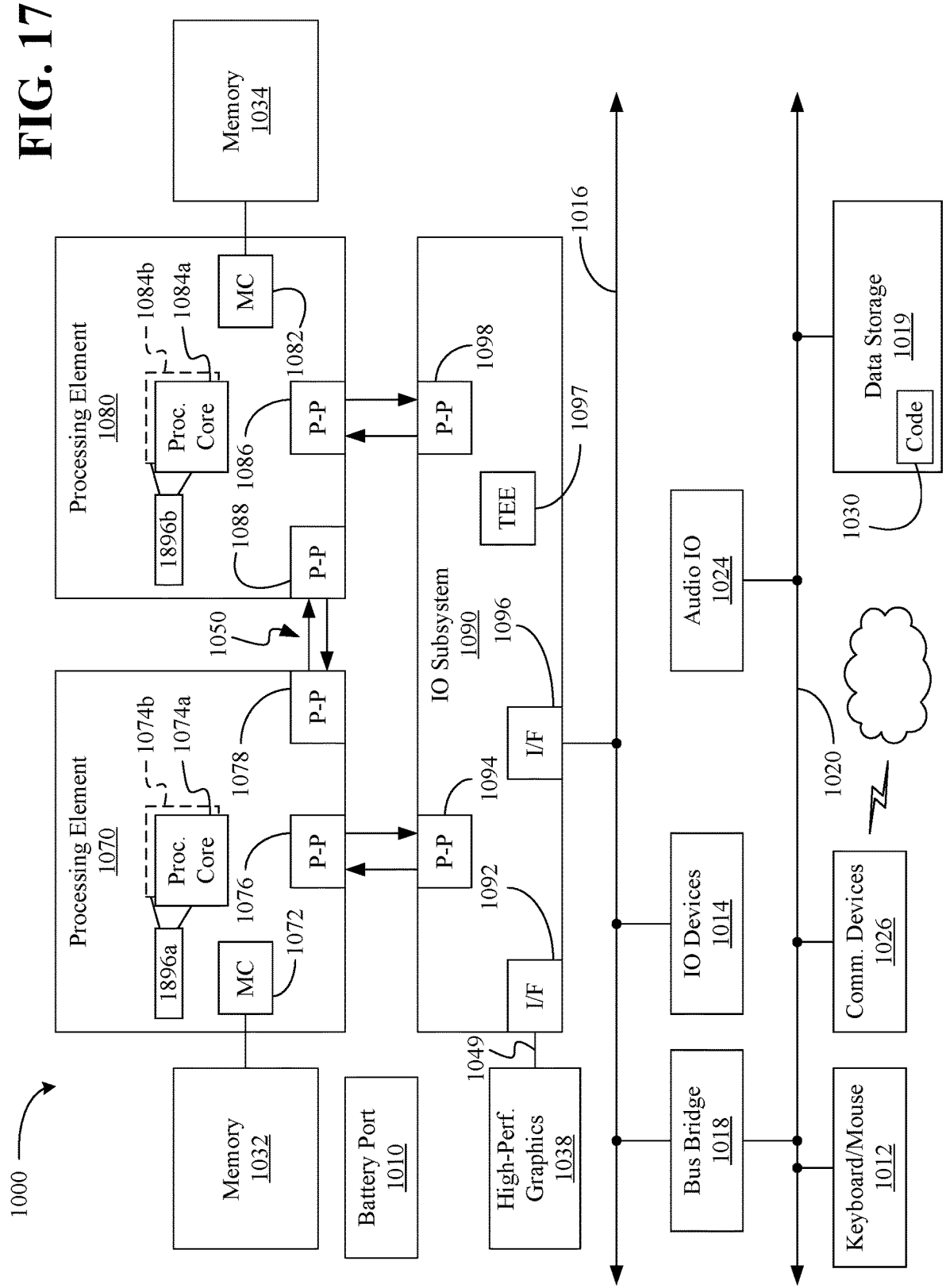
FIG. 17 is a block diagram of an example of a system according to an embodiment.

Referring now to FIG. 17, shown is a block diagram of a system 1000 embodiment in accordance with an embodiment. Shown in FIG. 17 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 17 may be implemented as a multi-drop bus rather than point-to-point interconnect.

As shown in FIG. 17, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 16.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 17, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 17, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 17, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIG. 3), the method 70 (FIGS. 7A to 7C), the method 85 (FIG. 8), the method 90 (FIG. 9), the method 100 (FIG. 10), the method 110 (FIG. 11), and/or the method 120 (FIG. 12), already discussed, and may be similar to the code 213 (FIG. 16), already discussed. Further, an audio I/O 1024 may be coupled to second bus 1020.

Note that other embodiments are contemplated. For example, instead of the point-to-point architecture of FIG. 17, a system may implement a multi-drop bus or another such communication topology.

Additional Notes and Examples

Example 1 may include an electronic processing system, comprising a processor, memory communicatively coupled to the processor, and logic communicatively coupled to the processor to create a range search tree based on a data stream, cluster data from the data stream based on the range search tree and density based spatial cluster of applications with noise, and detect an anomaly in the data stream based on the clustered data.

Example 2 may include the system of Example 1, wherein the logic is further to trigger an event based on the detected anomaly.

Example 3 may include the system of Example 2, wherein the data stream includes telemetry data, and wherein the logic is further to divide the telemetry data into one or more sets of short batches of data, and create the range search tree for each of the one or more sets of short batches of data.

Example 4 may include the system of Example 3, wherein the logic is further to divide the telemetry data into one or more sets of short batches of data based on a time interval window.

Example 5 may include the system of Example 4, wherein the logic is further to count moving window aggregations of outlier data.

Example 6 may include the system of any of Examples 1 to 5, wherein the range search tree is a self-balancing binary search tree.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to create a range search tree based on a data stream, cluster data from the data stream based on the range search tree and density based spatial cluster of applications with noise, and detect an anomaly in the data stream based on the clustered data.

Example 8 may include the apparatus of Example 7, wherein the logic is further to trigger an event based on the detected anomaly.

Example 9 may include the apparatus of Example 8, wherein the data stream includes telemetry data, and wherein the logic is further to divide the telemetry data into one or more sets of short batches of data, and create the range search tree for each of the one or more sets of short batches of data.

Example 10 may include the apparatus of Example 9, wherein the logic is further to divide the telemetry data into one or more sets of short batches of data based on a time interval window.

Example 11 may include the apparatus of Example 10, wherein the logic is further to count moving window aggregations of outlier data.

Example 12 may include the apparatus of any of Examples 7 to 11, wherein the range search tree is a self-balancing binary search tree.

Example 13 may include the apparatus of any of Examples 7 to 12, wherein the logic coupled to the one or more substrates includes transistor channel regions that are positioned within the one or more substrates.

Example 14 may include a method of processing a data stream, comprising creating a range search tree based on a data stream, clustering data from the data stream based on the range search tree and density based spatial cluster of applications with noise, and detecting an anomaly in the data stream based on the clustered data.

Example 15 may include the method of Example 14, further comprising triggering an event based on the detected anomaly.

Example 16 may include the method of Example 15, wherein the data stream includes telemetry data, further comprising dividing the telemetry data into one or more sets of short batches of data, and creating the range search tree for each of the one or more sets of short batches of data.

Example 17 may include the method of Example 16, further comprising dividing the telemetry data into one or more sets of short batches of data based on a time interval window.

Example 18 may include the method of Example 17, further comprising counting moving window aggregations of outlier data.

Example 19 may include the method of any of Examples 14 to 18, wherein the range search tree is a self-balancing binary search tree.

Example 20 may include at least one computer readable storage medium, comprising a set of instructions, which when executed by a computing device, cause the computing device to create a range search tree based on a data stream, cluster data from the data stream based on the range search tree and density based spatial cluster of applications with noise, and detect an anomaly in the data stream based on the clustered data.

Example 21 may include the at least one computer readable storage medium of Example 20, comprising a further set of instructions, which when executed by the computing device, cause the computing device to trigger an event based on the detected anomaly.

Example 22 may include the at least one computer readable storage medium of Example 21, wherein the data stream includes telemetry data, comprising a further set of instructions, which when executed by the computing device, cause the computing device to divide the telemetry data into one or more sets of short batches of data, and create the range search tree for each of the one or more sets of short batches of data.

Example 23 may include the at least one computer readable storage medium of Example 22, comprising a further set of instructions, which when executed by the computing device, cause the computing device to divide the telemetry data into one or more sets of short batches of data based on a time interval window.

Example 24 may include the at least one computer readable storage medium of Example 23, comprising a further set of instructions, which when executed by the computing device, cause the computing device to count moving window aggregations of outlier data.

Example 25 may include the at least one computer readable medium storage medium of any of Examples 19 to 24, wherein the range search tree is a self-balancing binary search tree.

Example 26 may include an anomaly detection apparatus, comprising means for creating a range search tree based on a data stream, means for clustering data from the data stream based on the range search tree and density based spatial cluster of applications with noise, and means for detecting an anomaly in the data stream based on the clustered data.

Example 27 may include the apparatus of Example 26, further comprising means for triggering an event based on the detected anomaly.

Example 28 may include the apparatus of Example 27, wherein the data stream includes telemetry data, further comprising means for dividing the telemetry data into one or more sets of short batches of data, and means for creating the range search tree for each of the one or more sets of short batches of data.

Example 29 may include the apparatus of Example 28, further comprising means for dividing the telemetry data into one or more sets of short batches of data based on a time interval window.

Example 30 may include the apparatus of Example 29, further comprising means for counting moving window aggregations of outlier data.

Example 31 may include the apparatus of any of Examples 26 to 30, wherein the range search tree is a self-balancing binary search tree.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. An electronic processing system, comprising:
a processor;
memory communicatively coupled to the processor; and
logic communicatively coupled to the processor to:
create a range search tree based on a data stream,
divide the data stream into a plurality of batches corresponding to different time windows,
cluster data of a first batch of the plurality of batches of the data stream based on the range search tree and application of a modified density based spatial cluster of applications with noise scheme,
count a number of neighbors of a first point of the first batch based on the range search tree,
identify the first point as being noise in the first batch based on the number being below a first threshold, wherein the first threshold is to correspond to a minimum number of points to form a cluster,
identify, in a group of batches of the plurality of batches subsequent to the first batch, that the first point is to reoccur and is to be classified as noise,
identify a total number of times that the first point is to be classified as noise in the first batch and the group of batches, and
detect that the first point is an anomaly in the data stream based on the total number of times meeting a second threshold that is to be different from the first threshold.
2. The system of claim 1, wherein the logic is further to:
trigger an event based on the detected anomaly.
3. The system of claim 2, wherein the data stream includes telemetry data, and wherein the logic is further to:
divide the telemetry data into the plurality of batches; and
create the range search tree for each of the plurality of batches.
4. The system of claim 3, wherein the logic is further to:
divide the telemetry data into the plurality of batches based on a time interval window.
5. The system of claim 4, wherein the logic is further to:
count moving window aggregations of outlier data.
6. The system of claim 1, wherein the range search tree is a self-balancing binary search tree.

7. A semiconductor package apparatus, comprising:
one or more substrates; and
logic coupled to the one or more substrates, wherein the logic is at least partly implemented in one or more of configurable logic and fixed-functionality logic hardware, the logic coupled to the one or more substrates to:
create a range search tree based on a data stream,
divide the data stream into a plurality of batches corresponding to different time windows,
cluster data of a first batch of the plurality of batches of the data stream based on the range search tree and application of a modified density based spatial cluster of applications with noise scheme,
count a number of neighbors of a first point of the first batch based on the range search tree,
identify the first point as being noise in the first batch based on the number being below a first threshold, wherein the first threshold is to correspond to a minimum number of points to form a cluster,
identify, in a group of batches of the plurality of batches subsequent to the first batch, that the first point is to reoccur and is to be classified as noise,
identify a total number of times that the first point is to be classified as noise in the first batch and the group of batches, and
detect that the first point is an anomaly in the data stream based on the total number of times meeting a second threshold that is to be different from the first threshold.

8. The apparatus of claim 7, wherein the logic is further to:
trigger an event based on the detected anomaly.

9. The apparatus of claim 8, wherein the data stream includes telemetry data, and wherein the logic is further to:
divide the telemetry data into the plurality of batches; and
create the range search tree for each of the plurality of batches.

10. The apparatus of claim 9, wherein the logic is further to:
divide the telemetry data into the plurality of batches based on a time interval window.

11. The apparatus of claim 10, wherein the logic is further to:
count moving window aggregations of outlier data.

12. The apparatus of claim 7, wherein the range search tree is a self-balancing binary search tree.

13. The apparatus of claim 7, wherein the logic coupled to the one or more substrates includes transistor channel regions that are positioned within the one or more substrates.

14. A method comprising:
creating a range search tree based on a data stream;
dividing the data stream into a plurality of batches corresponding to different time windows,
clustering data of a first batch of the plurality of batches of the data stream based on the range search tree and application of a modified density based spatial cluster of applications with noise scheme;
counting a number of neighbors of a first point of the first batch based on the range search tree;
identifying the first point as being noise in the first batch based on the number being below a first threshold, wherein the first threshold is to correspond to a minimum number of points to form a cluster;
identifying, in a group of batches of the plurality of batches subsequent to the first batch, that the first point reoccurs and is classified as noise;
identifying a total number of times that the first point is classified as noise in the first batch and the group of batches; and
detecting that the first point is an anomaly in the data stream based on the total number of times meeting a second threshold that is different from the first threshold.

15. The method of claim 14, further comprising:
triggering an event based on the detected anomaly.

16. The method of claim 15, wherein the data stream includes telemetry data, further comprising:
dividing the telemetry data into the plurality of batches; and
creating the range search tree for each of the batches.

17. The method of claim 16, further comprising:
dividing the telemetry data into the plurality of batches based on a time interval window.

18. The method of claim 17, further comprising:
counting moving window aggregations of outlier data.

19. The method of claim 14, wherein the range search tree is a self-balancing binary search tree.

20. At least one computer readable storage medium, comprising a set of instructions, which when executed by a computing device, cause the computing device to:
create a range search tree based on a data stream;
divide the data stream into a plurality of batches corresponding to different time windows;
cluster data of a first batch of the plurality of batches of the data stream based on the range search tree and application of a modified density based spatial cluster of applications with noise scheme;
count a number of neighbors of a first point of the first batch based on the range search tree;
identify the first point as being noise in the first batch based on the number being below a first threshold, wherein the first threshold is to correspond to a minimum number of points to form a cluster;
identify, in a group of batches of the plurality of batches subsequent to the first batch, that the first point is to reoccur and is to be classified as noise;
identify a total number of times that the first point is to be classified as noise in the first batch and the group of batches; and
detect that the first point is an anomaly in the data stream based on the total number of times meeting a second threshold that is to be different from the first threshold.

21. The at least one computer readable storage medium of claim 20, comprising a further set of instructions, which when executed by the computing device, cause the computing device to:
trigger an event based on the detected anomaly.

22. The at least one computer readable storage medium of claim 21, wherein the data stream includes telemetry data, and the at least one computer readable storage medium comprise a further set of instructions, which when executed by the computing device, cause the computing device to:
divide the telemetry data into the plurality of batches; and
create the range search tree for each of the batches.

23. The at least one computer readable storage medium of claim 22, comprising a further set of instructions, which when executed by the computing device, cause the computing device to:
divide the telemetry data into the plurality of batches of data based on a time interval window.

24. The at least one computer readable storage medium of claim 23, comprising a further set of instructions, which when executed by the computing device, cause the computing device to:

count moving window aggregations of outlier data.

25. The at least one computer readable storage medium of claim 20, wherein the range search tree is a self-balancing binary search tree.

\* \* \* \* \*